U# United States Patent                                                                [11] 3,612,224

| [72] | Inventor | Ulrich Walther<br>Bergneustadt, Germany |
|------|----------|---|
| [21] | Appl. No. | 832,615 |
| [22] | Filed | June 12, 1969 |
| [45] | Patented | Oct. 12, 1971 |
| [73] | Assignee | Dr. Hermann E. Muller Metallwarenfabrik<br>Bergneustadt G.m.b.H.<br>Cologne, Germany |
| [32] | Priority | June 20, 1968 |
| [33] | | Austria |
| [31] | | 5921/68 |

[54] DISK BRAKE CALIPER AND SUPPORTING STRUCTURE THEREFOR
11 Claims, 6 Drawing Figs.
[52] U.S. Cl. .................................................. 188/71.1,
188/73.3
[51] Int. Cl. ................................................ F16d 55/224
[50] Field of Search ......................................... 188/71.1,
72.4, 73.3, 216, 213

[56] References Cited
UNITED STATES PATENTS
543,703   7/1895   Robischung.................. 188/213

3,424,274   1/1969   Swift........................... 188/73.3 X
FOREIGN PATENTS
926,992   5/1963   Great Britain................ 188/72.4

*Primary Examiner*—George E. A. Halvosa
*Attorney*—Michael S. Striker

ABSTRACT: A disk brake has a rotor disk whose circumferentially extending margin is partially straddled by a U-shaped yoke. Resilient mounting means mounts the yoke in such a manner that it is permanently biassed to one position in which it freely straddles the marginal zones with its arms located at opposite axial sides of the rotor, but has freedom of movement against the biassing action of the mounting means both axially and circumferentially of the rotor. Friction means is arranged intermediate the respective arms of the yoke and the associated sides of the rotor, and actuating means is provided on one of the arms of the yoke and, when actuated, presses one of the friction means against one side of the rotor and thereby draws the yoke in opposite direction so that the other arm presses the other friction means against the other side of the rotor. When the operation of the actuating means is terminated, the yoke will return to its predetermined inoperative position under the biasing action of the resilient mounting means.

PATENTED OCT 12 1971 3,612,224

INVENTOR
ULRICH WALTHER
BY
ATTORNEY

INVENTOR
ULRICH WALTHER
BY
ATTORNEY

DISK BRAKE CALIPER AND SUPPORTING STRUCTURE THEREFOR

BACKGROUND OF THE INVENTION

The present invention relates generally to a disk brake, and more particularly to a so-called floating saddle disk brake.

"FLoating saddle" disk brakes are already known and have this designation because the saddle or yoke which effects pressing of the friction pads into contact with the rotor disk is mounted in floating manner, utilizing only a single cylinder and piston arrangement for operating both friction pads which engage the opposite axial sides of the rotor, instead of utilizing two such arrangements. The "floating-saddle" type of disk brake is becoming more and more popular because it requires relatively little space and less weight, because the single cylinder and piston arrangement is located at the inside of the wheel which is to be braked and thereby not only relatively protected but also capable of being so positioned as to obtain optimum cooling by the air currents developing during movement of the vehicle on which the brake is provided.

However, this type of disk brake has some significant disadvantages. It is not always possible to reliably prevent skewing of the various components, it has more movable components than the conventional type of disk brake wherein the saddle or yoke is immovably mounted, and certain of the components are more accessible to the deleterious action of dirt, water and ice. Attempts to provide guide means to guide the movable components in floating-saddle type of disk brakes, to thereby avoid skewing, have been generally unsuccessful because they are susceptible to fouling by dirt and water, can undergo deformations particularly during emergency braking, and are generally unreliable particularly in the wintertime because of ice formation which can inhibit or prevent proper guidance of the movable components.

It is therefore well known to those skilled in the art that there exists a need for a more reliable floating-saddle-type disk brake.

SUMMARY OF THE INVENTION

The present invention has as its general objective to provide a disk brake of the type in question which is not possessed of the aforementioned disadvantages.

It is a more particular object of the present invention to provide a floating saddle disk brake which avoids these disadvantages without requiring the use of guide means.

An additional object of the present invention is to provide such a brake which, because of the absence of guide means for movable components, is completely or at least substantially completely impervious to deleterious influences upon its action by water, dirt, ice or the like.

A concomitant object of the invention is to provide such a disk brake which is compact in its construction, light in weight, and which affords optimum cooling to its various components.

In pursuance of the above objects, and others which will become apparent hereafter, one feature of my invention resides in the provision of a disk brake which, briefly stated, comprises rotor disk means mounted for rotation about a predetermined axis and having a circumferentially extending marginal zone, and yoke means having two spaced arms. This yoke means corresponds to the "floating saddle" from which this type of disk brake has its name.

Resilient mounting means mounts the yoke means in and permanently biases it to an inoperative position in which it freely straddles a section of the marginal zone of the rotor disk means with the arms being located adjacent to but spaced from the respective axial sides of the rotor disk means. The mounting means permits the yoke means freedom of movement in direction axially as well as circumferentially of the rotor disk means to an operative position. Friction means is arranged intermediate the respective arms of the yoke means and the associated sides of the rotor disk means.

Finally, I provide actuating means which is provided on one of the arms and is operative for displacing the one friction means which is associated with the one arm in one axial direction against the respective side of the rotor disk means into frictional contact therewith, and for thereby effecting reactive displacement of the yoke means in the opposite axial direction with concomitant movement of the other arm towards and of the other friction means into frictional engagement with the other side of the rotor disk means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
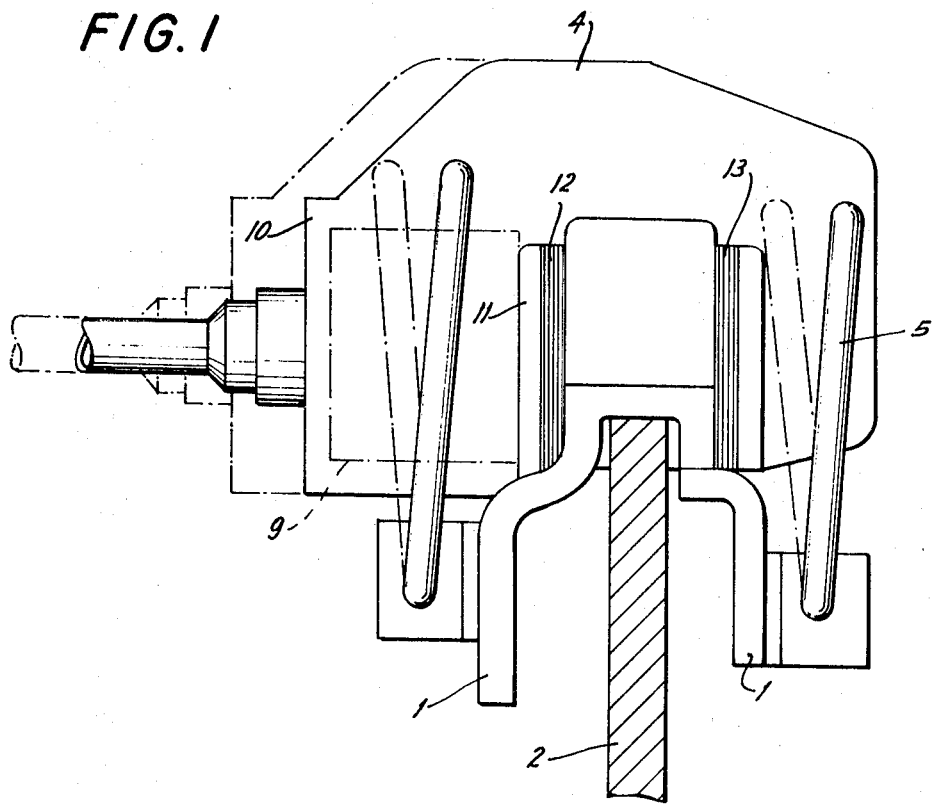
FIG. 1 is a diagrammatic side view of a brake according to one embodiment of the invention.
Figure 2:
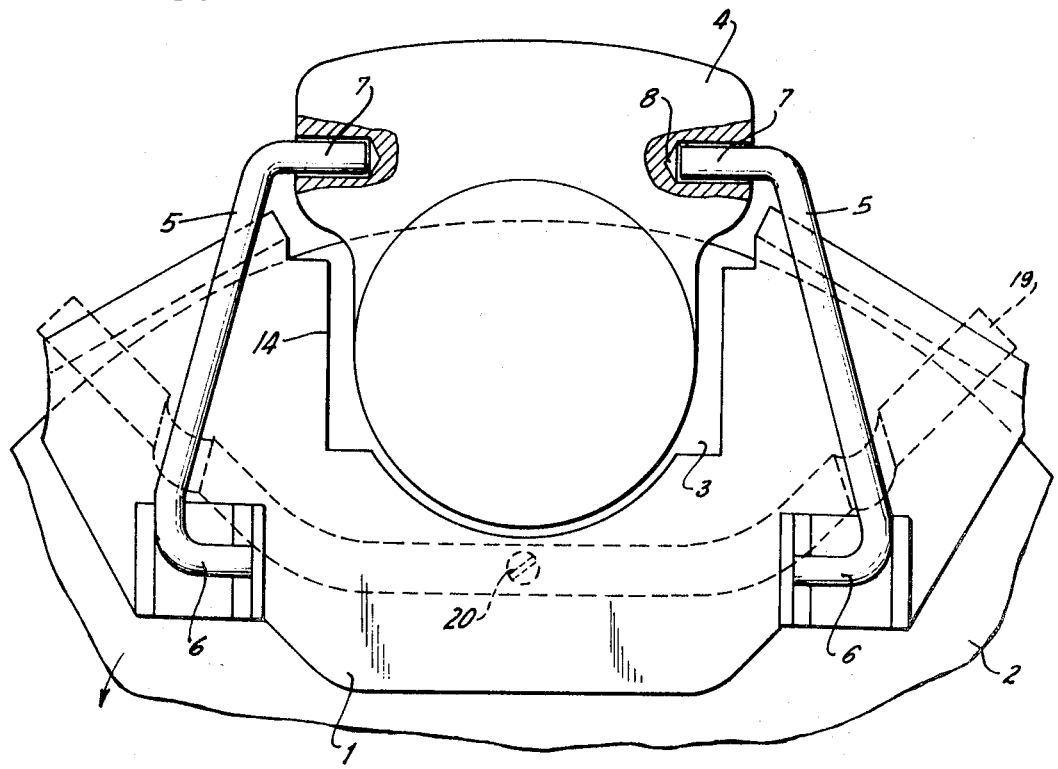
FIG. 2 is a front view, partially in section, of FIG. 1.

Discussing firstly FIGS. 1 and 2 it will be seen that reference numeral 1 identifies a support member which is in suitable manner secured to the (nonillustrated) chassis of a vehicle. Reference numeral 2 identifies a partially illustrated conventional rotor disk which is loosely embraced by the member 1. The latter is provided with a recess 3 shown in FIG. 2 wherein there is freely movably located the yoke 4. The yoke 4 is of conventional construction and of generally U-shaped cross-sectional configuration having arms located at opposite axial sides of the rotor disk 2.

According to the invention I provide four springy mounting members 5 of the configuration which is evident from FIGS. 1 and 2. Advantageously they consist of spring steel and each have an angled first end portion 6 and an angled second end portion 7. The end portions 6 of all of the members 5 are received in bores provided in the support member 1 and suitably secured therein, for instance by being welded thereto. The end portions are inserted into bores 8 provided in the yoke 4 wherein they can freely turn. It will be evident from FIGS. 1 and 2 that with this mounting arrangement the yoke 4 is freely movably mounted in the cutout or recess 3 and has not contact with the support member 1 or with the rotor disk 2. In other words, the yoke 4 is swingable against the biassing action of the members 5. The members 5 of course always urge the yoke 4 to the position illustrated in FIGS. 1 and 2, that is to an inoperative position.

One of the arms of the yoke 4 is provided with a conventional brake cylinder 9 having associated therewith the brake piston 10. When the piston 10 is actuated in conventional manner which is not believed to require detailed discussion because it is well known to those skilled in the art, it advances the friction pad carrier 11 with the associated friction pad 12 axially towards and into contact with one axial side of the rotor 2. In response to such contact the yoke 4 performs a reaction movement in that it is drawn in the opposite axial direction so that the other arm pushes the other friction pad 13 against the other axial side of the rotor disk 2. Because the end portions 6 of the members 5 are firmly secured in and to the support member 1, this movement of the yoke 4 can take place only against the biassing resistance of the spring members 5.

Because of the rotation of the rotor disk 2, which is at this time clamped between and in contact with the friction pads 12 and 13, the rotor disk 2 attempts to move the friction pads 12, 13 and thereby the yoke 4 in its direction of rotation in circumferential direction, as indicated by the arrow of FIG. 2. Accordingly, the friction pads 12, 13 and thereby the yoke 4 are also displaced circumferentially of the rotor disk 2 towards the sidewall 14 bounding the cutout 3 in the support member 1. This, of course, again takes place against the springy resistance of the members 5. If the braking action is strong enough, the yoke 4 may actually move into abutment with the sidewall 14. Such contact prevents twisting and permanent deformations of the members 5.

It will be appreciated that it is essential that the spring forces and the distances to be traversed until the yoke 4 or the associated friction pads 12, 13 abut against the sidewall 14— or the opposite sidewall bounding the cutout 3 if the rotor disk 2 rotates in the direction opposite the arrow in FIG. 2—are so coordinated that in all brake situations the spring members 5 will be protected against permanent deformations.

It will be that as soon as the braking episode is terminated, that is as soon as the supply of fluid to the cylinder 9 is terminated or diminished, the spring members 5 resiliently return the yoke 4 to its starting or inoperative position as shown in FIGS. 1 and 2, relative both to the support member 1 as well as to the rotor disk 2. It is not possible for skewing or jamming of the yoke 4 to occur, not even if ice or dirt are present in large quantities, because the yoke 4 with the friction pads 12 and 13 has no gliding guide contact with any other components but instead is freely suspended in the cutout 3.

Of course, the construction requires that the end portions 6 of the members 5 be firmly connected with the support member 1 and cannot turn there, or can turn only against strong spring resistance, that is against the torsional resistance which they offer. In the embodiment of FIGS. 1 and 2 this is accomplished by welding them to the member 1. If in this embodiment the friction pads 12, 13 are to be replaced the end portions 7 are removed from the bores 8 by deforming the springs until the end portions 7 move out of the bores 8. Now the entire yoke 4 can be lifted out of the cutout 3 without requiring a disconnection of hydraulic lines.

Figure 3:
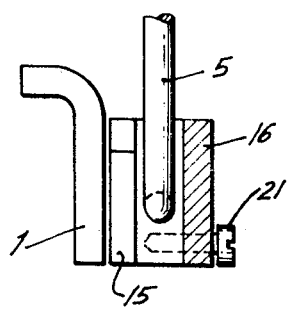
FIG. 3 is a fragmentary view, partially sectioned, of a detail of FIG. 1.
Figure 4:
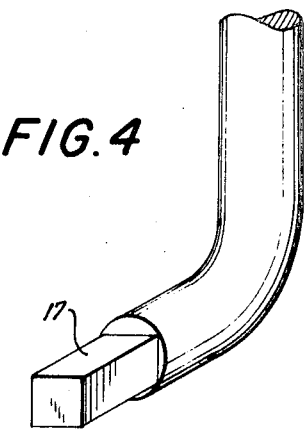
FIG. 4 is a fragmentary detail view, on an enlarged scale, of one form of biassing means for use in my novel brake.

As shown in FIGS. 3 and 4, however, it is possible to connect the end portions 6 of the members 5 in other manner than by welding. In the embodiment of FIG. 3 there are two limiting members 15 and 16 provided between which the end portions 6 and portions of the members 5 adjacent the end portions 6 are guided and located, so that lateral deflection of the members 5 is avoided or limited. Shifting of the yoke 4 during the braking action can then occur only against the spring resistance of the thus-anchored members 5. The construction according to FIG. 3 has the advantage over the construction of FIGS. 1 and 2, where a weld is used, that the members 5 can be readily replaced when this is necessary.

The embodiment in FIG. 4 shows the end portions 6 of the members 5 to be of polygonal cross-sectional configuration, and they are then introduced in bores in the member 1 which are of complementary cross-sectional configuration and thus prevent turning.

Figure 6:
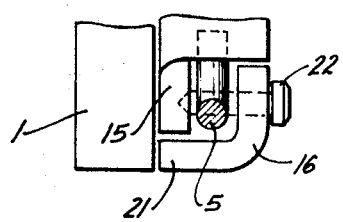
FIG. 6 is a plan view of the embodiment shown in FIG. 3.

Because there is nothing to prevent the end portions 6 from moving out of their associated bores in the member 5 in the embodiments of FIGS. 3 and 4, it is necessary that a separate element be provided which prevents this from occurring. This is shown in FIG. 6 in a view which is a plan view of FIG. 3. Here, the limiting member 16 is provided with a flange 21 which prevents the member 5 from moving out of its associated bore in the member 1, and the limiting member 16 is releasably connected by means of the screw 22. With this construction the members 5 can be readily removed and replaced when necessary and it is not required to deflect the members 5 against their strong spring action to remove their end portions 7 from the associated bores 8. However, it is necessary in this embodiment to release four of the screws 22, one associated with each of the members 5. If it is desired to avoid this, a single holding member 19 may be provided which, as diagrammatically suggested in FIG. 2, can be placed over the entire disk brake construction, where it embraces all four members 5, and which is secured with a single screw 20.

Figure 5:
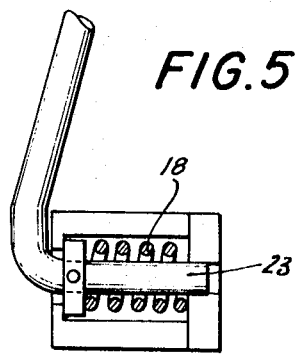
FIG. 5 is a diagrammatic fragmentary detail view of a further embodiment of the invention.

Finally, the embodiment illustrated in FIG. 5 shows the provision of a torsion spring 18 surrounding the end portion 6 of each member 5 (one such end portion of one such member being shown) within the associated bore in the member 1. This torsion spring has the same purpose as the constructions in FIGS. 3 and 4, replacing the limiting members of FIG. 3 and the particular cross-sectional configuration of the end portions 6 as shown in FIG. 4. It prevents deflection of the members 5 in direction transversely of the rotor disk 2, or rather resists such deflection in order to obtain the desired biasing action which subsequently restores the yoke 4 to its inoperative starting position.

It will be readily evident that my novel construction provides all of the advantages which in the introductory comments have been indicated as desirable. Furthermore, the yoke will abut against the support member 1 only in case of sharp braking, and even then only for brief periods of time because it is restored to its freely suspended inoperative starting position as soon as the braking incident is terminated. The dimensioning of the yoke 4 can be selected within a wide range of possibilities, and the yoke 4 can also be constructed to be of very light weight contrary to previous constructions of this type, because a large part of the angularly acting forces which act upon the friction pads 12 and 13 is absorbed by the biasing action of the members 5. Furthermore, it is important that with this construction an uneven wearing of the two friction pads 12, 13 is impossible because the axial movement of the yoke 4 is to all intents and purposes axially parallel to the axis of rotation of the disk 2 within the short bending distances required of the members 5. Finally, it is a further advantage of the present invention that no screeching or squeaking noises will develop on terminating the braking action because the yoke 4 with the friction pads 12, 13 will immediately return to its inoperative position when the braking action is completed.

It will be understood that each of the elements described above, or two or more together, may also find a useful application in other types of constructions differing from the types described above.

While the invention has been illustrated and described as embodied in a disk brake, it is not intended to be limited to the details shown, since various modifications and structural changes may be made without departing in any way from the spirit of the present invention.

I claim:

1. A disk brake comprising, in combination, rotor disk means mounted for rotation about a predetermined axis and having a circumferentially extending marginal zone; yoke means having two spaced arms; support means proximal to said rotor disk means and said yoke means; elongated combined resiliently flexible mounting means and guiding means having spaced ends respectively connected with said support means and said yoke means and mounting the latter in and permanently biasing it to an inoperative position in which said yoke means freely straddles a section of said marginal zone with said arms being located adjacent to but spaced from the respective axial sides of said rotor disk means, said combined means constituting the sole support and guidance for said yoke means and being capable of flexural movement so as to permit said yoke means freedom of guided movement in direction axially as well as circumferentially of said rotor disk means to an operative position; friction means arranged intermediate the respective arms of said yoke means and the associated sides of said rotor disk means; and actuating means provided on one of said arms and operative for displacing the one friction means associated with said one arm in one axial direction against the respective side of said rotor disk means into frictional contact therewith, and for thereby effecting reactive displacement of said yoke means in the opposite axial direction with concomitant movement of the other arm towards and of the other friction means into frictional engagement with the other side of said rotor disk means.

2. A disk brake as defined in claim 1, said combined resilient mounting and guiding means comprising spring elements arranged at said opposite sides of said rotor disk means.

3. A disk brake as defined in claim 2; further comprising a plurality of bores provided in said support means and yoke means, respectively; and wherein said spring elements each have opposite ends one of which is received in a bore in said support means and the other of which is received in a bore in said yoke means.

4. A disk brake as defined in claim 3; and further comprising abutment members received with said one ends in the bores associated with the latter laterally abutting against said one ends and configured for at least resisting turning of said one ends in the associated bores.

5. A disk brake as defined in claim 3; further comprising mating male and female sections of said one ends and said bores in said support means for preventing turning of said one ends in said bores of said support member.

6. A disk brake as defined in claim 3; and further comprising torsion spring means operatively associated with each of said one ends surrounding the same in the associated bore of said support means.

7. A disk brake as defined in claim 3; and further comprising retaining means associated wit at least said one end of each of said spring elements for retaining it in the associated bore of said support means.

8. A disk brake as defined in claim 7, said retaining means also being associated with said other ends of said spring elements for retaining them in the associated bores of said yoke means.

9. A disk brake as defined in claim 8, said retaining means being welded connections.

10. A disk brake as defined in claim 3; further comprising combined retaining and abutment means associated with said spring elements and operative for retaining said ends thereof in the respective bores and for preventing turning of said ends in the respective bores.

11. A disk brake as defined in claim 10, said combined retaining and abutment means comprising a single member embracing all of said spring elements, and connecting means connecting said single member to said support means.